Oct. 28, 1952  H. KIRWIN  2,615,316
SPRING WHEEL CONSTRUCTION
Filed Oct. 30, 1948  2 SHEETS—SHEET 1

Inventor
Henry Kirwin
By his Attorney

Oct. 28, 1952 — H. KIRWIN — 2,615,316
SPRING WHEEL CONSTRUCTION
Filed Oct. 30, 1948 — 2 SHEETS—SHEET 2

Inventor
Henry Kirwin
By his Attorney

Patented Oct. 28, 1952

2,615,316

UNITED STATES PATENT OFFICE 2,615,316

SPRING WHEEL CONSTRUCTION

Henry Kirwin, Dedham, Mass.

Application October 30, 1948, Serial No. 57,537

7 Claims. (Cl. 64—15)

This invention relates to improvements in spring wheel construction and is applicable generally to rotors comprising combinations of separate rims and hubs and resilient means connecting them together. The invention is herein illustrated, by way of example, in its application to V-belt pulleys and automobile wheels. Other applications will suggest themselves to persons skilled in the various arts to which the invention pertains.

It is an object of the present invention to provide an improved wheel construction in which a rim which is constructed as a unit separate from its hub is so mounted relatively to the hub that it will yield radially under the application of external pressure. Such a construction applied to automobile wheels enables the wheel itself to absorb many road shocks. Applied to a pulley, the illustrated construction is adapted to maintain a continuous tension on the belt without danger of stretching or straining it.

With the above and other objects in view the present invention, in one aspect thereof, consists in the combination with a rim and a hub which are distinct and separate from each other of a resilient element or elements normally maintaining coincidence of the respective axes of said rim and hub and characterized by an attaching means comprising a clip formed therein and extending inwardly therefrom for engagement with a clip receiver which is rigid with the hub, the clip and the clip receiver being maintained in mutual registration by two members extending outwardly from the hub and arranged in contiguous relation to opposite edges of the clip and to opposite sides of the clip receiver.

The invention also contemplates the provision of a clip assembly similar to that described above for attaching a resilient element to a rim. In the illustrated organization an endless resilient element has formed therein clips extending alternately inwardly and outwardly for attachment to the hub and to the rim, respectively.

In accordance with a further feature of the invention a resilient element connecting the rim and the hub is mounted in a closed chamber which includes two members extending inwardly from the rim and forming side walls of the chamber and forming also means for maintaining proper registration of the outwardly extending clips and their clip receivers. Similar members extending outwardly from the hub form the inner portions of the side walls of the closed chamber.

The invention also contemplates the provision of means, herein illustrated as keys, for holding the clips in engagement with the clip receivers by preventing contraction of the clips. In the illustrated organization the keys are held in proper registration with the clips and the clip receivers by the clip-engaging members above referred to.

In order to prevent excessive stress or strain on the resilient element suitable means is provided for positively limiting the relative radial movement of the rim and the hub.

These and other features of the invention will now be described with reference to the accompanying drawings and pointed out in the appended claims.

Figure 1:
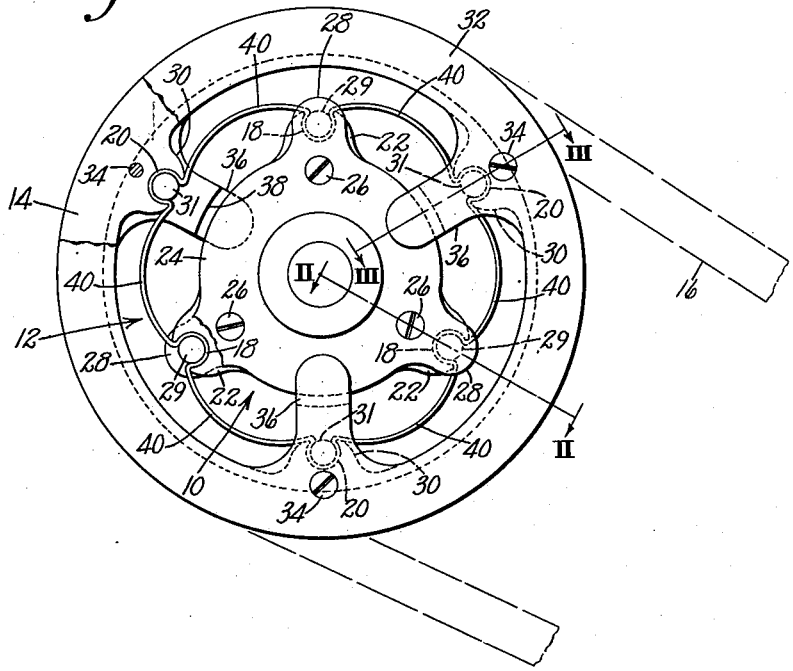
Fig. 1 is a front elevation of a V-belt pulley incorporating the features of the present invention.
Figure 4:
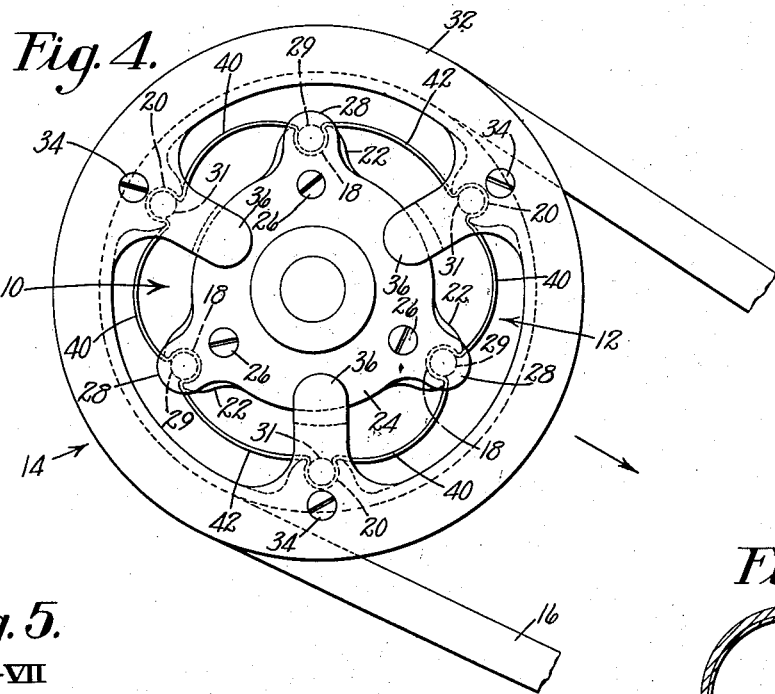
Fig. 4 is a front elevation similar to Fig. 1, showing the rim and the hub offset radially relatively to each other.

The novel V-belt pulley illustrated in Fig. 1 comprises a hub 10 having mounted therein an endless spring 12 which mounts a rim 14. The spring 12 is so constructed and arranged that the rim and the hub are normally in concentric relation to each other as shown in Fig. 1. When tension is applied to a V-belt 16 carried by the rim 14 the rim and the hub assume an eccentric relation to each other as shown in Fig. 4. In this position the tension of the V-belt in the direction of the arrow in Fig. 4 is balanced by the force of the spring 12 in the opposite direction.

Figure 2:
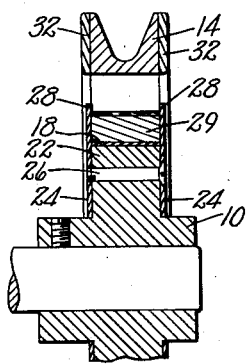
Fig. 2 is a section taken on the line II—II of Fig. 1.

The spring may be mounted in the hub and the rim in any suitable manner but I prefer to provide the construction illustrated in Fig. 1 in which the spring is shaped to provide six clips extending alternately inwardly and outwardly from the spring, the inwardly extending clips being identified by the numeral 18 and the outwardly extending clips by the numeral 20. Each clip 18 is arcuate in shape as seen in Fig. 1 and comprises about three quarters of a complete circle. For mounting each clip 18 in the hub 10 said hub has three extensions 22 uniformly spaced from each other and provided respectively with recesses complemental in shape to the clips 18. For retaining the clips against lateral displacement from the recesses in the extensions of hub 10 two plates 24 (Fig. 2) are secured by flat headed screws 26 to the hub 10. Each plate has extensions 28 uniformly spaced from each other and arranged to register with the clips 18 as shown in Fig. 1. In order to prevent the clips 18 from being contracted and withdrawn from the recesses under the stresses incidental to normal operation of the pulley cylindrical keys 29 are inserted into the clips 18 to hold them against contraction. Similar keys 31 are inserted into the clips 20.

Figure 3:
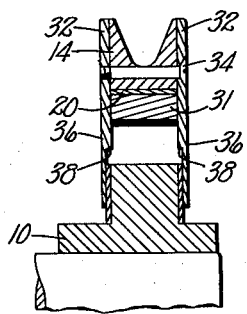
Fig. 3 is a section taken on the line III—III of Fig. 1.

For mounting the outwardly extending clips 20 in the rim 14, said rim has inward extensions 30 uniformly spaced from each other and provided respectively with recesses complemental in shape to the clips 20. It will be seen in Fig. 1 that the inward extensions 30 are centrally spaced between the outward extensions 22 of the hub. For retaining the clips 20 against lateral displacement from the recesses in the inward extensions of the rim two annular plates 32 are secured by flat headed screws 34 to the rim 14. Each plate has inward extensions 36 uniformly spaced from each other and arranged to register with the clips 20, as shown in Fig. 1. In order to insure that the assembly will run true at all times the extensions 36 are arranged to project radially inwardly to a point where their end portions engage a substantial width of the plates 24 on the hub 10. In order to limit relative movement of the rim and the hub radially, the extensions 36 are provided with arcuate shoulders 38 (Fig. 3) constructed and arranged to engage the edge faces of the plates 24. In order that the spring 12 will be long enough to permit relative movement of the rim and the hub within the limits defined by the space between the shoulders 38 and the edge faces of the plates 24 the sections of the springs between the clips are in the form of an arc having a radius of curvature substantially less than the distance from the center of each such section to the common axis of the rim and the hub. In Figs. 1 and 4 said arcuate sections are indicated by the numerals 40 and 42. When the pulley is in its position shown in Fig. 4 with the rim in eccentric relation to the hub the sections 40 of the spring 12 are stressed by shortening the axes of their respective curvatures and the sections 42 are stressed by lengthening the axes of their curvatures. It will be understood that in the course of rotation of the illustrated pulley each section of the spring is continually flexing between its state of curvature indicated by the numeral 40 and its state of curvature indicated by the numeral 42. The gage and temper of the spring is such that it will not fracture under normal service conditions. While the illustrated spring is a single thickness of resilient metal it is to be understood that a laminated structure may be provided, if desired.

Figure 5:
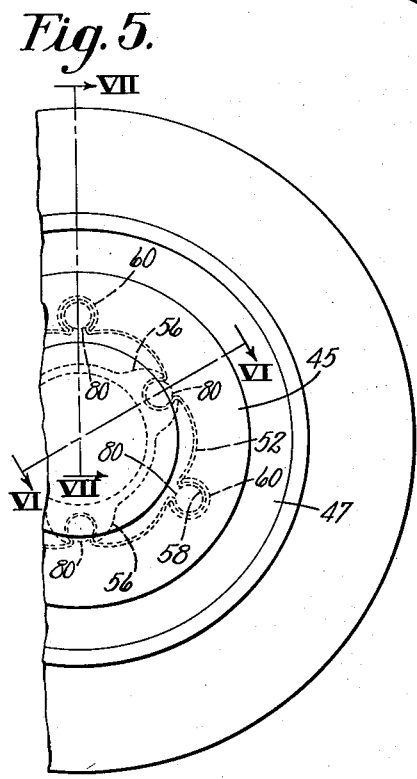
Fig. 5 is a front elevation of a portion of an automobile wheel incorporating the features of the present invention.
Figure 6:
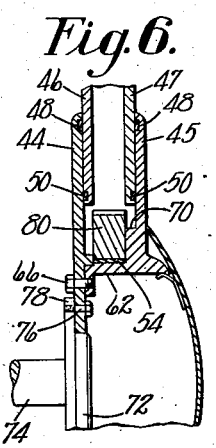
Fig. 6 is a section taken on the line VI—VI of Fig. 5.
Figure 7:
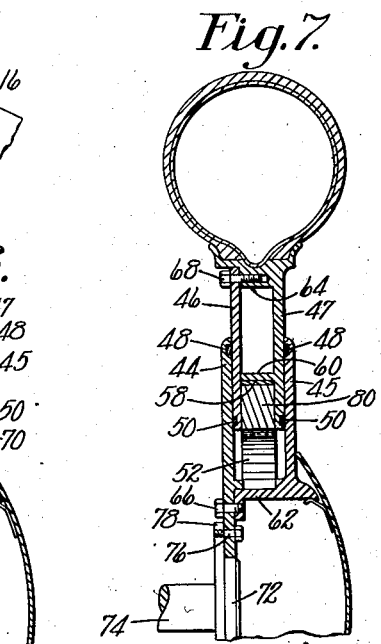
Fig. 7 is a section taken on the line VII—VII of Fig. 5.

In Figs. 5, 6 and 7 there is illustrated an automobile wheel incorporating the features of the present invention. In general the construction of the hub, the rim and the spring shown in Fig. 5 and their arrangement relatively to each other are similar to the construction and arrangement above described with reference to Fig. 1. The differences which exist between the structure shown in Fig. 1 and the structure shown in Fig. 5 are mainly such as are required by the difference in function between the two rotors. Referring to Figs. 6 and 7 the illustrated hub is characterized by outwardly extending spaced annular plates 44 and 45 between which are positioned spaced annular plates 46 and 47 extending inwardly from the rim. The plates 46 and 47 are in sliding engagement with the plates 44 and 45 and suitable sealing rings 48 and 50 may be provided between the plates if desired. The plates serve as side walls of an enclosure in which is mounted a spring 52 (Fig. 5) similar to the spring 12 shown in Fig. 1. A flange 62 of the plate 45 serves as the inner wall of the enclosure and a similar flange 64 of the plate 47 serves as the outer wall of the enclosure. The flange 62 is secured by screws 66 to the plate 44 and the flange 64 is secured to the plate 46 by screws 68. Inwardly extending clips 54 of the spring 52 are mounted in complementally shaped recesses formed in outward extensions 56 of the hub and are secured therein by cylindrical keys 80. Outwardly extending clips 58 are seated in arcuate members 60 secured to the plate 47 and are secured by cylindrical keys 80. Relative radial movement of the rim and the hub is limited by a shoulder 70 (Fig. 6) formed in the plate 45 and arranged to be engaged by the edge face of the plate 47.

The illustrated automobile wheel may be mounted on its axle in any known manner. As illustrated in Figs. 6 and 7 the plate 44 has a circular opening defining the center of the wheel and registering with a plate 72 which turns with the axle 74, the inner margin of the plate 44 being secured by screws 76 to a flange 78 of the plate 72.

While I prefer to provide an endless spring between the rim and the hub of my improved rotor, it is within the scope of my invention to provide a plurality of springs, if desired. In the illustrated construction there would be six such springs and the separation between adjacent springs would occur at the center of the clip, dividing the clip into two equal sections.

Having thus described my invention, what I claim as new and desire to secure by Letters Patent of the United States is:

1. The combination with a rim and a hub of a resilient element connecting the rim and the hub, a clip formed in said element and extending inwardly therefrom, a clip receiver rigid with the hub and arranged to mount the inwardly extending clip, and two members extending outwardly from the hub and arranged in contiguous relation to opposite edges of the clip and to opposite sides of the clip receiver.

2. The combination with a rim and a hub of a resilient element connecting the rim and the hub, a clip formed in said element and extending inwardly therefrom, a clip receiver rigid with the hub and arranged to mount the inwardly extending clip, a key mounted in and retained by the clip and constructed and arranged to prevent contraction of the clip from the clip receiver, and two members extending outwardly from the hub and arranged in contiguous relation to opposite edges of the clip, to opposite sides of the clip receiver and to opposite ends of the key.

3. The combination with a rim and a hub of an endless resilient element connecting the rim and the hub, a clip formed in said element and extending outwardly therefrom, a clip receiver projecting inwardly from the rim and constructed and arranged to mount the outwardly extending clip, and two arms extending inwardly from the rim and arranged in contiguous relation to opposite edges of the clip, to opposite sides of the clip receiver, and to opposite sides of the hub.

4. The combination with a rim and a hub of an endless resilient element connecting the rim and the hub, a clip formed in said element and extending outwardly therefrom, a clip receiver projecting inwardly from the rim and constructed and arranged to mount the outwardly extending clip, a key mounted in and retained by the clip and constructed and arranged to prevent contraction of the clip from the clip receiver, and two members extending inwardly from the rim and arranged in contiguous relation to opposite edges of the clip, to opposite sides of the clip receiver, to opposite ends of the key and to opposite sides of the hub, said members having formed therein shoulders constructed and arranged to engage the hub thereby to limit relative radial movement of the rim and the hub.

5. The combination with a rim and a hub of a resilient element connecting the rim and the hub, a clip formed in said element and extending outwardly therefrom, a clip receiver projecting inwardly from the rim and constructed and arranged to mount the outwardly extending clip, a key mounted in and retained by the clip and constructed and arranged to prevent contraction of the clip from the clip receiver, and two members extending inwardly from the rim and arranged in contiguous relation to opposite edges of the clip, to opposite sides of the clip receiver, to opposite sides of the hub, and to opposite ends of the key, said members forming side walls of a closed chamber in which the resilient element is mounted.

6. The combination with a rim and a hub of an endless resilient element connecting the rim and the hub, a first clip formed in said element and extending outwardly therefrom, a clip receiver constructed and arranged to mount the first clip, a second clip formed in said element and extending inwardly therefrom, a clip receiver projecting outwardly from the hub and constructed and arranged to mount the second clip, two plates extending inwardly from the rim, and two plates extending outwardly from the hub, said four plates forming with the peripheral surface of the hub and the hub-facing surface of the rim a closed chamber in which the resilient element is mounted.

7. The combination with a rim and a hub of an endless resilient element connecting the rim and the hub, an inwardly extending clip formed in said element, an outwardly extending clip formed in said element and offset circumferentially of the rim from the inwardly extending clip, a clip receiver on the hub mounting the inwardly extending clip, a clip receiver on the rim mounting the outwardly extending clip, two arms extending inwardly from the rim and arranged in contiguous relation to opposite edges of the outwardly extending clip, to opposite sides of the clip receiver on the rim and to opposite sides of the hub, and two arms extending outwardly from the hub and arranged in contiguous relation to opposite edges of the inwardly extending clip and to opposite sides of the clip receiver on the hub.

HENRY KIRWIN.

REFERENCES CITED

The following references are of record in the file of this patent:

UNITED STATES PATENTS

| Number | Name | Date |
| --- | --- | --- |
| 519,807 | Cloud | May 15, 1894 |
| 604,883 | Hayes | May 31, 1898 |
| 1,000,322 | Brooks | Aug. 8, 1911 |
| 1,054,118 | Hipkins | Feb. 25, 1913 |
| 1,071,953 | Picard | Sept. 2, 1913 |
| 1,133,882 | Palmer | Mar. 30, 1915 |
| 1,244,681 | Worsley | Oct. 30, 1917 |
| 1,323,235 | Hobson | Nov. 25, 1919 |
| 1,461,408 | Watts | July 10, 1923 |
| 2,463,226 | Walden | Mar. 1, 1949 |